US009582582B2

(12) United States Patent
Ohashi et al.

(10) Patent No.: US 9,582,582 B2
(45) Date of Patent: Feb. 28, 2017

(54) ELECTRONIC APPARATUS, CONTENT RECOMMENDATION METHOD, AND STORAGE MEDIUM FOR UPDATING RECOMMENDATION DISPLAY INFORMATION CONTAINING A CONTENT LIST

(75) Inventors: Takeshi Ohashi, Kanagawa (JP); Hiroaki Ogawa, Chiba (JP)

(73) Assignee: SONY CORPORATION, Tokyo (JP)

(*) Notice: Subject to any disclaimer, the term of this patent is extended or adjusted under 35 U.S.C. 154(b) by 1327 days.

(21) Appl. No.: 12/576,516

(22) Filed: Oct. 9, 2009

(65) Prior Publication Data

US 2010/0094799 A1 Apr. 15, 2010

(30) Foreign Application Priority Data

Oct. 14, 2008 (JP) ................................. 2008-265077

(51) Int. Cl.
*G06F 17/30* (2006.01)
(52) U.S. Cl.
CPC .............................. *G06F 17/30867* (2013.01)
(58) Field of Classification Search
CPC .................................. G06F 17/00; G06F 17/30
See application file for complete search history.

(56) References Cited

U.S. PATENT DOCUMENTS

| 3,699,533 | A | * | 10/1972 | Hunter | G06F 12/0864 711/108 |
| 3,766,533 | A | * | 10/1973 | Black | G06F 17/30982 365/125 |
| 3,774,155 | A | * | 11/1973 | McPherson | G06K 17/00 235/434 |
| 3,781,811 | A | * | 12/1973 | Yakata | G06F 12/1425 711/163 |

(Continued)

FOREIGN PATENT DOCUMENTS

| JP | 2005-332265 | 12/2005 |
| JP | 2005-348153 | 12/2005 |

(Continued)

*Primary Examiner* — Farhan Syed
(74) *Attorney, Agent, or Firm* — Oblon, McClelland, Maier & Neustadt, L.L.P.

(57) ABSTRACT

An electronic apparatus includes a storage section, a first generation section, a second generation section, an update section, and an output section. The storage section stores contents, titles thereof, and viewing history information on viewing histories of the contents by a user. The first generation section generates, based on the stored viewing history information, recommendation display information containing as a recommended-content list a list of titles of contents that the user has not viewed among the stored contents. The second generation section generates dependence information on first and second contents among the stored contents by analyzing text information on a network, the second content being created dependently on the first content. The update section updates, based on the depen- (Continued)

dence information, the recommendation display information so that the user is prevented from viewing the second content before the first content. The output section outputs the updated recommendation display information.

12 Claims, 12 Drawing Sheets

(56) References Cited

U.S. PATENT DOCUMENTS

| | | | | |
|---|---|---|---|---|
| 3,810,108 A * | 5/1974 | Krewson | | G06F 17/30982 |
| | | | | 365/125 |
| 3,830,959 A * | 8/1974 | Dischert | | H04N 9/093 |
| | | | | 348/263 |
| 3,843,872 A * | 10/1974 | Shimomura | | G01K 7/14 |
| | | | | 374/171 |
| 3,848,234 A * | 11/1974 | MacDonald | | G06F 12/0833 |
| | | | | 711/109 |
| 3,858,100 A * | 12/1974 | Bussi | | H02P 7/2913 |
| | | | | 388/814 |
| 3,882,400 A * | 5/1975 | Hamada | | H03G 3/348 |
| | | | | 455/158.3 |
| 3,909,787 A * | 9/1975 | Laurer | | G06K 7/14 |
| | | | | 235/437 |
| 3,992,970 A * | 11/1976 | Chibana | | G10H 1/08 |
| | | | | 84/625 |
| 4,020,473 A * | 4/1977 | Fujimura | | G06F 17/30955 |
| 4,056,778 A * | 11/1977 | Randazzo | | G01R 23/10 |
| | | | | 324/166 |
| 4,115,851 A * | 9/1978 | Nagano | | G06F 13/1631 |
| | | | | 711/109 |
| 4,140,087 A * | 2/1979 | Daumer | | F02D 41/182 |
| | | | | 123/486 |
| 4,147,022 A * | 4/1979 | Ichikawa | | G04R 20/00 |
| | | | | 368/201 |
| 4,193,255 A * | 3/1980 | Ebihara | | G04G 9/085 |
| | | | | 368/111 |
| 4,316,260 A * | 2/1982 | Hideshima | | G05B 19/056 |
| | | | | 700/15 |
| 4,328,556 A * | 5/1982 | Abe | | G05B 15/02 |
| | | | | 700/23 |
| 4,414,622 A * | 11/1983 | Matsumoto | | G06F 9/30101 |
| | | | | 711/215 |
| 4,466,089 A * | 8/1984 | Wachi | | G11B 5/012 |
| | | | | 360/32 |
| 4,511,962 A * | 4/1985 | Machida | | G06T 1/60 |
| | | | | 345/531 |
| 5,280,469 A * | 1/1994 | Taniguchi et al. | | 370/250 |
| 5,432,620 A * | 7/1995 | Watanabe et al. | | 358/462 |
| 5,457,692 A * | 10/1995 | Ishinabe et al. | | 370/522 |
| 5,600,655 A * | 2/1997 | Ishinabe et al. | | 370/524 |
| 6,003,677 A * | 12/1999 | Foley | | B07C 1/00 |
| | | | | 209/2 |
| 6,151,595 A * | 11/2000 | Pirolli et al. | | |
| 6,636,836 B1 * | 10/2003 | Pyo | | 705/7.29 |
| 7,373,318 B2 * | 5/2008 | Kutsumi et al. | | 705/26.7 |
| 7,577,645 B2 * | 8/2009 | Yamamoto et al. | | |
| 7,587,382 B2 * | 9/2009 | Yamamoto et al. | | |
| 7,600,244 B2 * | 10/2009 | Maruyama et al. | | 725/47 |
| 7,600,262 B2 * | 10/2009 | Nomura | | 726/27 |
| 7,610,301 B2 * | 10/2009 | Ito | | |
| 7,734,650 B2 * | 6/2010 | Naito et al. | | 707/791 |
| 7,756,868 B2 * | 7/2010 | Lee | | 707/725 |
| 7,873,798 B2 * | 1/2011 | Miyazaki et al. | | 711/154 |
| 7,933,837 B2 * | 4/2011 | Kawamoto et al. | | 705/50 |
| 8,032,526 B2 * | 10/2011 | Fukazawa et al. | | 707/722 |
| 8,046,384 B2 * | 10/2011 | Saito et al. | | 707/802 |
| 8,082,511 B2 * | 12/2011 | Sobotka et al. | | 715/758 |
| 8,117,135 B2 * | 2/2012 | Hong et al. | | 706/5 |
| 8,117,211 B2 * | 2/2012 | Yamamoto et al. | | 707/749 |
| 8,117,212 B2 * | 2/2012 | Tateno et al. | | 707/749 |
| 2004/0181818 A1 * | 9/2004 | Heyner et al. | | 725/146 |
| 2006/0015902 A1 * | 1/2006 | Matsuura et al. | | 725/46 |
| 2006/0269258 A1 * | 11/2006 | Murakoshi | | 386/125 |
| 2008/0209339 A1 * | 8/2008 | Macadaan et al. | | 715/745 |
| 2008/0209343 A1 * | 8/2008 | Macadaan et al. | | 715/747 |
| 2008/0209349 A1 * | 8/2008 | Macadaan et al. | | 715/762 |
| 2008/0209350 A1 * | 8/2008 | Sobotka et al. | | 715/762 |
| 2008/0209351 A1 * | 8/2008 | Macadaan et al. | | 715/762 |
| 2009/0055385 A1 * | 2/2009 | Jeon et al. | | 707/5 |
| 2010/0129783 A1 * | 5/2010 | Liang | | G09B 7/04 |
| | | | | 434/322 |

FOREIGN PATENT DOCUMENTS

| | | |
|---|---|---|
| JP | 2007-58842 | 3/2007 |
| JP | 2007-202181 | 8/2007 |
| JP | 2008-092016 | 4/2008 |
| JP | 2008-205623 | 9/2008 |

* cited by examiner

| Content as parody etc. | Content necessary to be viewed first (source content of parody etc.) |
|---|---|
| Title a | Title A |
| Title b | Title B |
| Title c | Title C |
| Title d | Title D |
| Title e | Title E |
| ⋮ | ⋮ |

| Content title | Title of source content of parody etc. |
|---|---|
| Title a | Title A |
| Title b | – |
| Title c | – |
| Title d | – |
| Title e | Title E |
| Title f | – |
| Title g | Title G |

FIG.10

(A) Viewing history of user A

- Title A
- Title a
- Title C
- Title E
- Title F
- Title f (B) Viewing history of user B

- Title A
- Title B
- Title b
- Title C
- Title D
- Title E
- Title F
- Title f (C) Recommended content for user A

- Title B
- Title b
- Title D (A) Viewing history of user A (B) Viewing history of user B (A) Viewing history of user A

- Title A
- Title a

- Title C

- Title E
- Title F
- Title f (B) Viewing history of user B

- Title A

- Title B
- Title b
- Title C
- Title D
- Title E
- Title F
- Title f

⇩

(C) Recommended-content list 34

Recommended content

- Title B
- Title D

FIG.14

ELECTRONIC APPARATUS, CONTENT RECOMMENDATION METHOD, AND STORAGE MEDIUM FOR UPDATING RECOMMENDATION DISPLAY INFORMATION CONTAINING A CONTENT LIST

BACKGROUND OF THE INVENTION

1. Field of the Invention

The present invention relates to an electronic apparatus capable of recommending contents to a user, a content recommendation method for the electronic apparatus, and a program therefor.

2. Description of the Related Art

Conventionally, as techniques of recommending contents such as a television program and an on-demand video to a user, there have been known techniques using an algorithm such as a collaborative filtering and a content-based filtering.

In a recommendation technique using the collaborative filtering, for example, content-viewing preferences (histories) of many users are accumulated and then contents are recommended to a user using a viewing preference of another user, the viewing preference being similar to that of the user (for example, see Japanese Patent Application Laid-open No. 2005-332265).

In a recommendation technique using the content-based filtering, contents similar to contents that have been viewed by a user are recommended based on metadata included in contents (for example, see Japanese Patent Application Laid-open No. 2007-058842).

SUMMARY OF THE INVENTION

Incidentally, among contents, there exists a content that is created by being dependent on a certain content, such as a content as a parody of a certain content. When viewing such a content, a user can enjoy the content more if the user has viewed a content that is a source of the dependence in advance and obtained background knowledge. However, in the recommendation techniques described above, judgment as to whether a user has background knowledge on contents is not performed. With regard to a content of a series, by checking a title thereof, a user can recognize that the content constitutes a series and it is better to view a content of a previous volume of the series. However, with regard to contents as a parody and the like, it is difficult to judge from titles thereof that they are dependent on other contents. For that reason, in a case where a recommended content is a content that is created by being dependent on another content, the user is deprived of chances to enjoy more.

In view of the circumstances described above, there is a need for an electronic apparatus capable of preventing a content created by being dependent on a content that a user has not viewed from being recommended to the user and viewed by the user, a content recommendation method for the electronic apparatus, and a program therefor.

According to an embodiment of the present invention, there is provided an electronic apparatus including a storage means, a first generation means, a second generation means, an update means, and an output means.

The storage means stores a plurality of contents, titles of the plurality of contents, and viewing history information on viewing histories of the plurality of contents by a user. The first generation means generates, based on the stored viewing history information, recommendation display information that contains as a recommended-content list a list of titles of contents that the user has not viewed out of the plurality of stored contents. The second generation means generates dependence information on a first content and a second content out of the plurality of stored contents by analyzing text information on a network, the second content being created by being dependent on the first content. The update means updates, based on the dependence information, the recommendation display information so that the user is prevented from viewing the second content before the first content. The output means outputs the updated recommendation display information.

Here, the contents are video contents such as movies and dramas, and may be on-demand contents that are acquired via the network or contents that are broadcast as television programs. The text information is, for example, an introductory essay, a critical essay, or a weblog of a viewer regarding movies and programs on the Internet. The second content created by being dependent on the first content includes contents such as a homage, a spin-off, a crossover, and a parody of the first content. For the generation of the recommendation display information, methods including a collaborative filtering, a content-based filtering, a Bayesian network, and a rule-based (intentional) filtering are used.

The electronic apparatus may be a server connected to a user device via the network. In this case, the viewing history information may be received from the user device and then stored. In this case, the output refers to transmission of the recommendation display information from the server to the user device in order to display the recommendation display information on the user device.

The electronic apparatus may be a user device as a local device. In this case, the viewing history information may be stored as reproduction history information by the user device, or may be received and stored as reproduction history information by another device that is connectable to the user device. Further, the viewing history information may be information that is received from a portable device of a user, the portable device being different from the user device, when the user of the user device views a content in a theater or the like. In this case, the portable device only needs to have a GPS (Global Positioning System) function and a function of storing a screening schedule of contents in a theater or the like and be capable of generating the viewing history information by those functions. In this case, the output means that a display section of the user device is caused to display the recommendation display information and the recommendation display information is output to a display device externally connected to the user device to cause the display device to display the recommendation display information.

With this structure, the electronic apparatus can prevent the second content created by being dependent on the first content, that is, a content that should be viewed by a user after the user views the first content and obtains background knowledge, from being viewed before the first content is viewed. Accordingly, the electronic apparatus can recommend a content that is based on user's knowledge on the content and is suitable for the user, with the result that user's interest can be increased.

The update means may add a title of the first content to the recommended-content list when the second content is contained in the recommended-content list but the first content is excluded therein.

Accordingly, by adding the first content to the recommended-content list, the electronic apparatus can prevent the second content from being recommended and viewed before the first content.

The update means may update the recommendation display information so that a title of the second content is displayed in subordination to the title of the first content.

Here, "displayed in subordination" means a case where, for example, the second content is displayed below the first content with an indent. Accordingly, the user can understand that the second content is created by being dependent on the first content, with the result that the second content can be prevented from being viewed before the first content.

The update means may update the recommendation display information so that information notifying that, before the second content, the first content is to be viewed is output, when a title of the second content displayed on the recommended-content list is selected based on the recommendation display information by an operation of the user.

Here, "information notifying" is message information or audio information that is pop-up-displayed on the recommended-content list, for example. Accordingly, the user can grasp reliably that the second content should be viewed before the first content, with the result that it is possible to prevent that the second content is viewed before the first content.

The update means may delete a title of the second content from the recommended-content list when the title of the second content is contained in the recommended-content list but a title of the first content is excluded therein.

Accordingly, by deleting the second content from the recommended-content list, the electronic apparatus can prevent the second content from being recommended and viewed before the first content.

The storage means may store creation year information indicating creation years of the plurality of contents and a predetermined keyword indicating dependence. In this case, the second generation means may include an extraction means, a retrieval means, and a judgment means. The extraction means extracts a first title out of the plurality of titles from the text information. The retrieval means retrieves a second title different from the first title and the predetermined keyword from a predetermined range of a text in the text information, the predetermined range including the extracted first title. The judgment means judges, when a predetermined number or more of the second titles are retrieved and the predetermined keyword is retrieved, that a content having an earlier creation year of the creation years is the first content and a content having a later creation year of the creation years is the second content out of the two contents corresponding to the first title and the second title, based on the stored creation year information.

Here, the keyword is a word such as "parody", "spin-off", "crossover", and "homage". Accordingly, the electronic apparatus extracts two contents appearing together with the keyword in the same text and compares creation years of both the contents, with the result that dependence between the contents can be judged accurately and dependence information can be generated.

The storage means may store creation year information indicating creation years of the plurality of contents. In this case, the second generation means may include a retrieval means and a judgment means. The retrieval means retrieves character names in the plurality of contents from the text information. The judgment means judges, when the retrieved character names are common to two contents out of the plurality of contents, that a content having an earlier creation year of the creation years is the first content and a content having a later creation year of the creation years is the second content out of the two contents, based on the stored creation year information.

Here, the character names refer to a name of a person in a live-action content, character names of a hero, a monster, and the like in a special effect content, character names of an animation content or a computer graphics content, and the like. Accordingly, the electronic apparatus extracts two contents having common character names and compares creation years of both the contents, with the result that a spin-off relationship between the two contents can be judged accurately and dependence information can be generated. Here, in a case where character names are names of existing persons in the past or at present, the judgment means may judge that both the contents do not have dependence even with the common character names.

In this case, the retrieval means may further retrieve main character names in the plurality of contents. Moreover, in this case, the judgment means may judge, when the retrieved character names are common to two contents out of the plurality of contents and the main character names in the two contents are different from each other, that a content having an earlier creation year of the creation years is the first content and a content having a later creation year of the creation years is the second content.

Accordingly, the electronic apparatus can judge a spin-off relationship between two contents reliably by making good use of a feature of the contents in the spin-off relationship, the feature being that characters are common but main characters are different.

The second generation means may include a retrieval means and a judgment means. The retrieval means retrieves main character names in the plurality of contents from the text information. The judgment means judges, when at least two of the main character names are retrieved from one content out of the plurality of contents and the at least two of the main character names are individually retrieved as main character names of other contents out of the plurality of contents, that the other contents are the first contents and the one content is the second content.

Accordingly, the electronic apparatus can judge a crossover relationship among the plurality of contents reliably by making good use of a feature of the crossover works, the feature being that each of the plurality of main characters becomes a main character of each of other contents.

According to another embodiment of the present invention, there is provided a content recommendation method that includes storing a plurality of contents, titles of the plurality of contents, and viewing history information on viewing histories of the plurality of contents by a user. In this method, based on the stored viewing history information, recommendation display information that contains as a recommended-content list a list of titles of contents that the user has not viewed out of the plurality of stored contents is generated. Further, by analyzing text information on a network, dependence information on a first content and a second content out of the plurality of stored contents is generated, the second content being created by being dependent on the first content. Further, based on the dependence information, the recommendation display information is updated so that the user is prevented from viewing the second content before the first content, and the updated recommendation display information is output.

According to this method, it can be prevented that the second content created by being dependent on the first content, that is, a content that should be viewed by a user after the user views the first content and obtains background knowledge, is viewed before the first content is viewed.

According to still another embodiment of the present invention, there is provided a program causing an electronic apparatus to execute a storing step, a first generating step, a second generating step, an updating step, and an outputting step.

In the storing step, a plurality of contents, titles of the plurality of contents, and viewing history information on viewing histories of the plurality of contents by a user are stored. In the first generating step, based on the stored viewing history information, recommendation display information that contains as a recommended-content list a list of titles of contents that the user has not viewed out of the plurality of stored contents is generated. In the second generating step, dependence information on a first content and a second content out of the plurality of stored contents is generated by analyzing text information on a network, the second content being created by being dependent on the first content. In the updating step, based on the dependence information, the recommendation display information is updated so that the user is prevented from viewing the second content before the first content. In the outputting step, the updated recommendation display information is output.

According to the program, it can be prevented that the second content created by being dependent on the first content, that is, a content that should be viewed by a user after the user views the first content and obtains background knowledge, is viewed before the first content is viewed.

According to still another embodiment of the present invention, there is provided an electronic apparatus including a storage section, a first generation section, a second generation section, an update section, and an output section.

The storage section stores a plurality of contents, titles of the plurality of contents, and viewing history information on viewing histories of the plurality of contents by a user. The first generation section generates, based on the stored viewing history information, recommendation display information that contains as a recommended-content list a list of titles of contents that the user has not viewed out of the plurality of stored contents. The second generation section generates dependence information on a first content and a second content out of the plurality of stored contents by analyzing text information on a network, the second content being created by being dependent on the first content. The update section updates, based on the dependence information, the recommendation display information so that the user is prevented from viewing the second content before the first content. The output section outputs the updated recommendation display information.

As described above, according to the embodiments of the present invention, it is possible to prevent that a content created by being dependent on a content that a user has not viewed is recommended to the user and viewed by the user.

These and other objects, features and advantages of the present invention will become more apparent in light of the following detailed description of best mode embodiments thereof, as illustrated in the accompanying drawings.

BRIEF DESCRIPTION OF DRAWINGS

FIG. 10 is a diagram showing an example of a main recommended-content list generated in the embodiment of the present invention;

FIGS. 14A to 14C are diagrams showing an example of a recommended-content list displayed on the TV of the user according to another embodiment of the present invention.

DESCRIPTION OF PREFERRED EMBODIMENTS

Hereinafter, embodiments of the present invention will be described with reference to the drawings.
[Outline of System]

Figure 1:
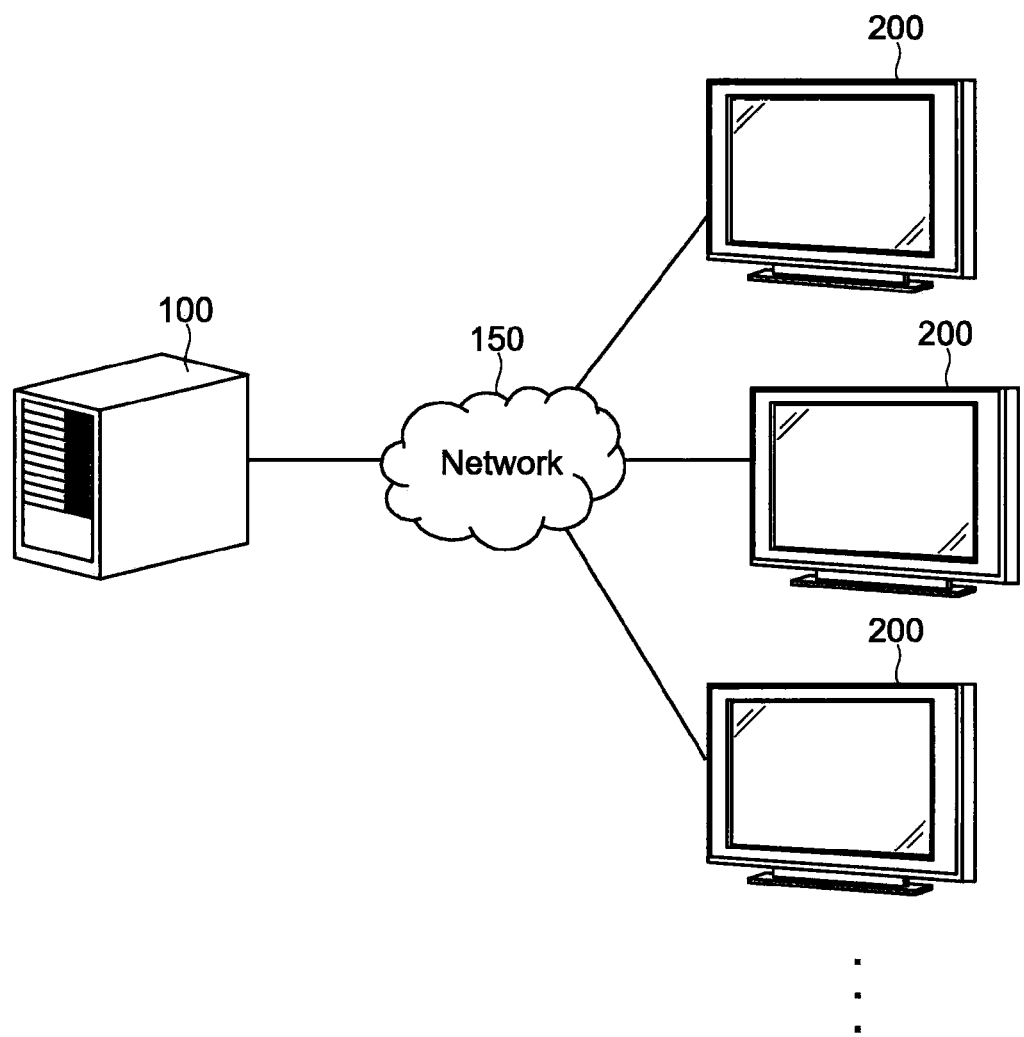
FIG. 1 is an overview diagram showing a content recommendation system including a server according to an embodiment of the present invention.

FIG. 1 is an overview diagram showing a content recommendation system including a server as an electronic apparatus according to an embodiment of the present invention.

As shown in FIG. 1, the content recommendation system in this embodiment is structured by connecting a server 100 and a plurality of television sets 200 (hereinafter, referred to as TV 200s) to each other via a network 150.

The server 100 stores data of contents and recommends, to a user of each of the TVs 200, contents that are assumed to be contents that the user wishes to view, out of the stored contents. The user of the TV 200 receives a desired content out of the recommended contents from the server 100 and reproduces the desired content.

The network 150 is a closed network that can be accessed by only specific TVs 200 each having an authority to connect the server 100, for example, but may be an opened network such as the Internet. Further, the network 150 may be a network established in a specific area such as a LAN (Local Area Network).

The contents are, for example, on-demand (download) contents such as movies, dramas, and cartoons, but may be contents delivered by streaming in an IPTV service.

[Hardware Structure of Server]

Figure 2:
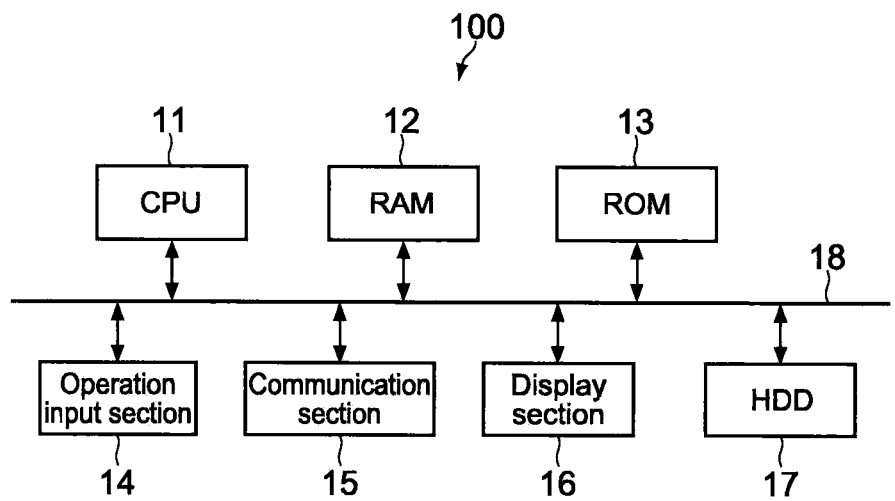
FIG. 2 is a block diagram showing a hardware structure of the server according to the embodiment of the present invention.

FIG. 2 is a block diagram showing a hardware structure of the server 100 described above.

As shown in FIG. 2, the server 100 includes a CPU (Central Processing Unit) 11, a RAM (Random Access Memory) 12, a ROM (Read Only Memory) 13, an operation input section 14, a communication section 15, a display section 16, an HDD (Hard Disk Drive) 17, and the like, and these are connected to each other via an internal bus 18.

The CPU 11 accesses the RAM 12 and the like as necessary and controls the whole block of the server 100 collectively while performing various operations. The RAM 12 is used as a working area or the like for the CPU 11 and temporarily stores an OS, various programs being executed, and various pieces of data being processed. The ROM 13 is a nonvolatile memory that fixedly stores an OS executed by the CPU 11 and firmware such as programs and various parameters.

The operation input section 14 includes a button, a switch, a keyboard, a mouse, and a touch panel, for example, and inputs various instructions owing to operations of a user (administrator) of the server 100 and outputs them to the CPU 11.

The communication section 15 includes an NIC (Network Interface Card) and a modem, for example, and is connected to the network 150 to execute communication processing of data such as contents with the TVs 200.

The display section 16 is, for example, an LCD (Liquid Crystal Display) or the like, and displays video signals, various administration screens, and the like. The display section 16 may be incorporated into the server 100 or may be externally connected to the server 100 via a cable or the like.

The HDD 17 stores, in a built-in hard disk thereof, the OS, various programs, contents that are recommended to a user of the TV 200 and metadata thereof, viewing history information, recommendation information, and content dependence information to be described later that are necessary for content recommendation, and the like. Further, the HDD 17 reads out the stored data from the hard disk to the RAM 12. The contents may be stored in another storage apparatus connected to the server 100 via the network 150, instead of the HDD 17 of the server 100.

[Software Structure of Server]

Figure 3:
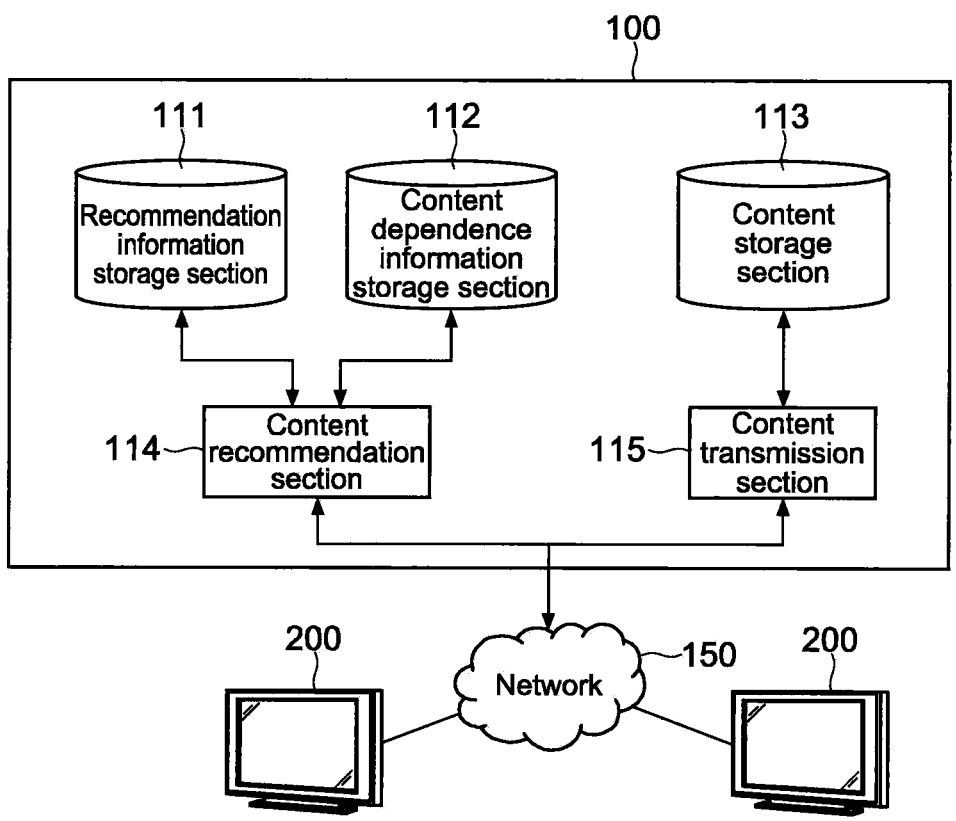
FIG. 3 is a diagram showing a software structure of the server according to the embodiment of the present invention.

FIG. 3 is a diagram showing a software structure of the server 100.

As shown in FIG. 3, the server 100 includes, as software, a recommendation information storage section 111, a content dependence information storage section 112, a content storage section 113, a content recommendation section 114, and a content transmission section 115.

The content storage section 113 stores many contents of diverse genres including movies, dramas, and cartoons and metadata thereof (title, director, producer, creation year, etc.).

The recommendation information storage section 111 stores recommended-content information on contents to be recommended to a user (metadata such as title, director, and the like), out of the contents stored in the content storage section 113. The recommended contents are contents in which user's knowledge information that will be described later is not taken into account. The recommended contents may be, for example, contents that receive a relatively-high evaluation of each user, out of the contents stored in the content storage section 113, or may be contents with which producers of the contents wish to promote sales (viewing). Further, the recommended contents may be contents that have been finished with handling of rights such as copyright and accordingly can be provided to users by the server 100.

The content dependence information storage section 112 stores dependence information among the contents stored in the content storage section 113 as a database (hereinafter, referred to as dependence information DB). The dependence information refers to information on dependence between a content and another content that is created depending on the content, the dependence being, for example, a parody, a spin-off, a crossover, and a homage.

The content recommendation section 114 generates recommendation information on a content that is eventually recommended to a user based on the recommended-content information stored in the recommendation information storage section 111, the user's knowledge information that will be described later, and the dependence information DB, and transmits the recommendation information to the TV 200. The recommendation information includes a title list of recommended contents (hereinafter, referred to as recommended-content list), metadata of the recommended contents, a program for causing the recommended-content list to be displayed on the TV 200, and the like. Contents to be listed in the recommended-content list are determined using an algorithm such as a collaborative filtering and a content-based filtering based on content viewing history information of users, the viewing history information being received from the plurality of TVs 200.

Based on the recommendation information, the content transmission section 115 reads out, from the content storage section 113, a content that a user of the TV 200 has selected and requested from the TV 200, and transmits the content to the TV 200. A request of a content from the TV 200 to the content transmission section 115 is performed by transmitting a title of a content or an ID or the like for identifying the content from the TV 200 to the content transmission section 115. The content transmission section 115 retrieves the content from the content storage section 113 based on the title or the ID.

[Structure of Content Recommendation Section]

Figure 4:
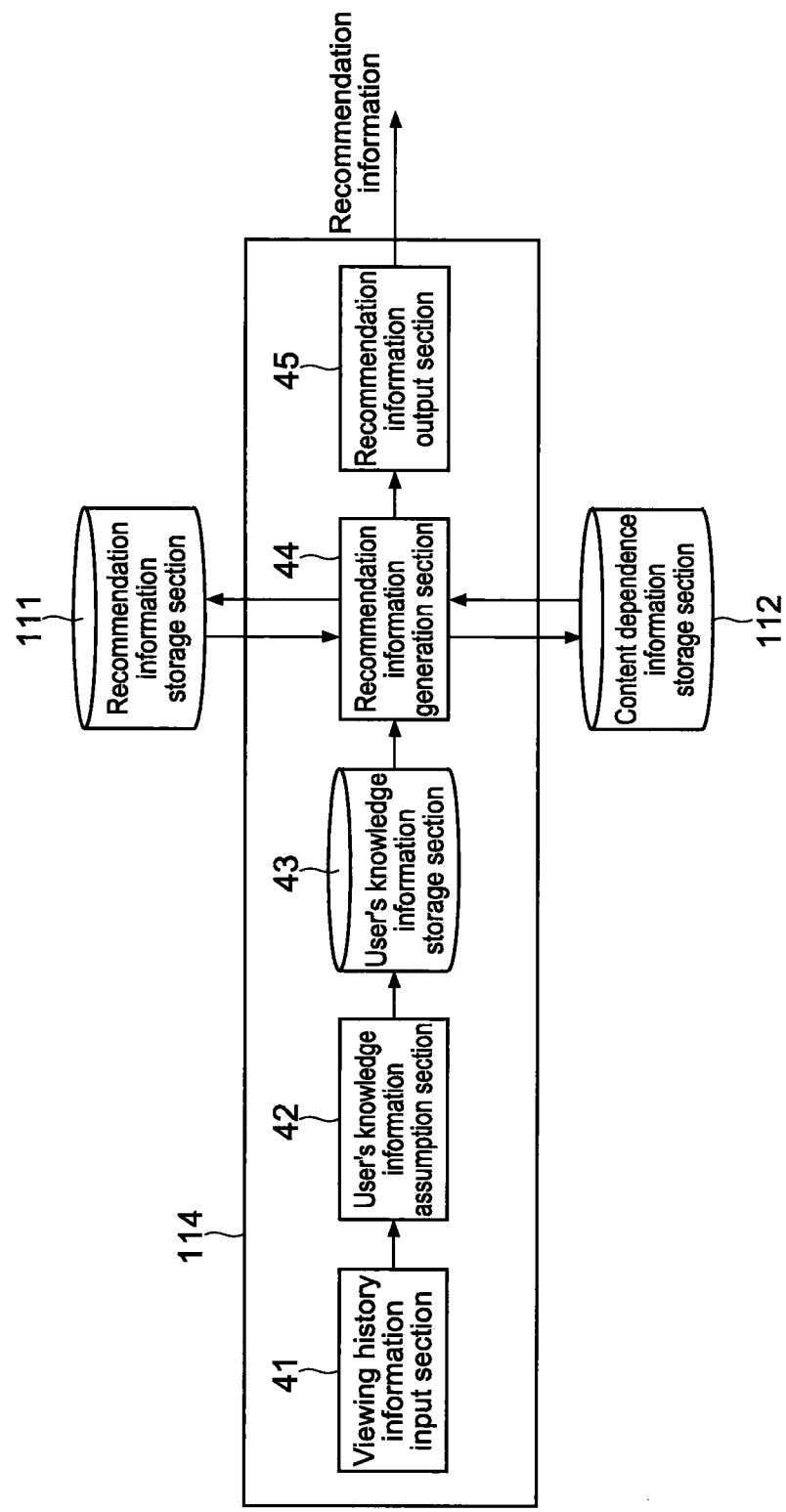
FIG. 4 is a diagram showing a detailed structure of a content recommendation section of the server according to the embodiment of the present invention.

FIG. 4 is a diagram showing a detailed structure of the content recommendation section 114.

As shown in FIG. 4, the content recommendation section 114 includes a viewing history information input section 41, a user's knowledge information assumption section 42, a user's knowledge information storage section 43, a recommendation information generation section 44, and a recommendation information output section 45.

The viewing history information input section 41 receives inputs of viewing history information of users of the plurality of TVs 200, from the TVs 200. The viewing history information includes reproduction history information of contents in each of the TVs 200. Here, the reproduction history information is information regarding from when and until when broadcast signals of which channel have been received in the TV 200, information regarding which DVD has been reproduced in the TV 200, and the like. The TV 200 transmits the reproduced (selected) channel and information on a time of the reproduction, a title of a content such as a DVD that have been reproduced, time and date of the reproduction, and the like, as reproduction history information, to the server 100. The transmission of the reproduction history information is performed, for example, each time a predetermined number of contents are reproduced or a predetermined number of channel selections are performed, each time the TV 200 is connected to the server 100 via the network 150, or regularly.

As the viewing history information, there may be input reproduction history information of contents in a user's mobile device such as a cellular phone, a portable game device, a portable DVD player, and a laptop PC, and a user's stationary recording/reproducing apparatus such as an HDD recorder, other than the TV 200. In this case, each of those devices transmits its reproduction history information (title of reproduced content, time and date of reproduction, etc.) to the TV 200 each time the device reproduces the predetermined number of contents or regularly. Further, each of those devices may transmit reproduction history information to the TV 200 when connected to the TV 200 via a predetermined network (wired or wireless). The TV 200 transmits its own reproduction history information and the reproduction history information received from each of those devices to the server 100 while integrating them or separately. Moreover, each of those devices may transmit its reproduction history information directly to the server 100 without intermediation of the TV 200. In this case, each of those devices transmits identification information indicating that it is a device of a user of the TV 200, together with the reproduction history information. Accordingly, the server 100 can handle the reproduction history information transmitted from the TV 200 and that transmitted from each of the other devices as the reproduction history information of the same user.

Further, the viewing history information input section 41 can receive user's viewing experience information other than the reproduction history information as viewing history information from the user's mobile device via the TV 200 or without intermediation of the TV 200. For example, in a case where a user views a movie in a theater or the like with a mobile device on hand, the mobile device transmits a viewing experience on the movie to the TV 200 or the server 100 as viewing history information of a content. In this case, the mobile device has a GPS function and a schedule grasping function. In other words, the mobile device detects an entrance of the user to the theater and an exit of the user from the theater by the GPS function. The mobile device records positional information of the theater and the entrance time and exit time to/from the theater. Then, the mobile device grasps a movie that is shown at a theater corresponding to the positional information and at a time corresponding to the entrance/exit time by the schedule grasping function, and then transmits a title of the movie and a screening time thereof to the TV 200 or the server 100 as viewing history information.

The mobile device may acquire viewing experience information of a content by an input of a user and transmit the viewing experience information to the TV 200 or the server 100. For example, in a case where the user views a content with a reproducing apparatus of another person in a friend's house or the like, the mobile device prompts the user to input information on the viewing experience at a predetermined timing by a predetermined GUI when the user leaves the house of the friend. When receiving the input of viewing experience information from the user, the mobile device transmits the viewing experience information as viewing history information to the TV 200 or the server 100. In addition, the mobile device may include various sensors such as a microphone and a camera, and may generate viewing history information by detecting a predetermined word (title name etc.) or a video (video of displayed content etc.) with which it is assumed that the user has viewed a content.

Further, by analyzing a weblog or an appointment book of a user, the TV 200 or another device may detect information with which it is assumed that the user has viewed a content and transmit the information as viewing history information to the server 100.

The user's knowledge information assumption section 42 assumes knowledge information of a user of each TV 200 regarding contents based on viewing history information input to the viewing history information input section 41, generates user's knowledge information as abstracted information, and stores it in the user's knowledge information storage section 43. The user's knowledge information is, for example, a title of a content that is assumed to be viewed (learned) by a user, and the user name (or user ID), but is not limited thereto. The user's knowledge information may indicate an amount of knowledge (level of knowledge) of a user regarding contents. For example, the user's knowledge information assumption section 42 may determine a user's viewing time of a content (all the content is viewed or only a part thereof is viewed) based on a viewing time included in viewing history information and calculate an amount of knowledge in accordance with the viewing time. The amount of knowledge may be represented by one-dimensional scalar value or may be represented as a vector value by some indexes.

Further, together with the viewing history information, the user's knowledge information assumption section 42 may receive evaluation information of each user regarding a content and calculate an amount of knowledge based on the evaluation information. In this case, the TV 200 or another device may prompt a user to input evaluation information every time a content is reproduced or regularly, for example, and include the evaluation information in the reproduction history information to transmit it to the server 100. The evaluation information may be a score represented by a plurality of levels or text information, for example.

The recommendation information generation section 44 generates recommendation information that is eventually provided to a user based on the recommended-content information stored in the recommendation information storage section 111, the user's knowledge information stored in the user's knowledge information storage section 43, and the dependence information DB stored in the content dependence information storage section 112. Specifically, the recommendation information generation section 44 generates recommendation information for a specific user by using, for example, an algorithm of a collaborative filtering based on many users' knowledge information. Further, based on the dependence information DB stored in the content dependence information storage section 112, the recommendation information generation section 44 updates recommendation information that has already been generated and supplies it to the recommendation information output section 45.

The recommendation information output section 45 transmits the recommendation information supplied from the recommendation information generation section 44 to the TV 200, for example, in response to a request from the TV 200 or regularly.

[Hardware Structure of TV]

Figure 5:
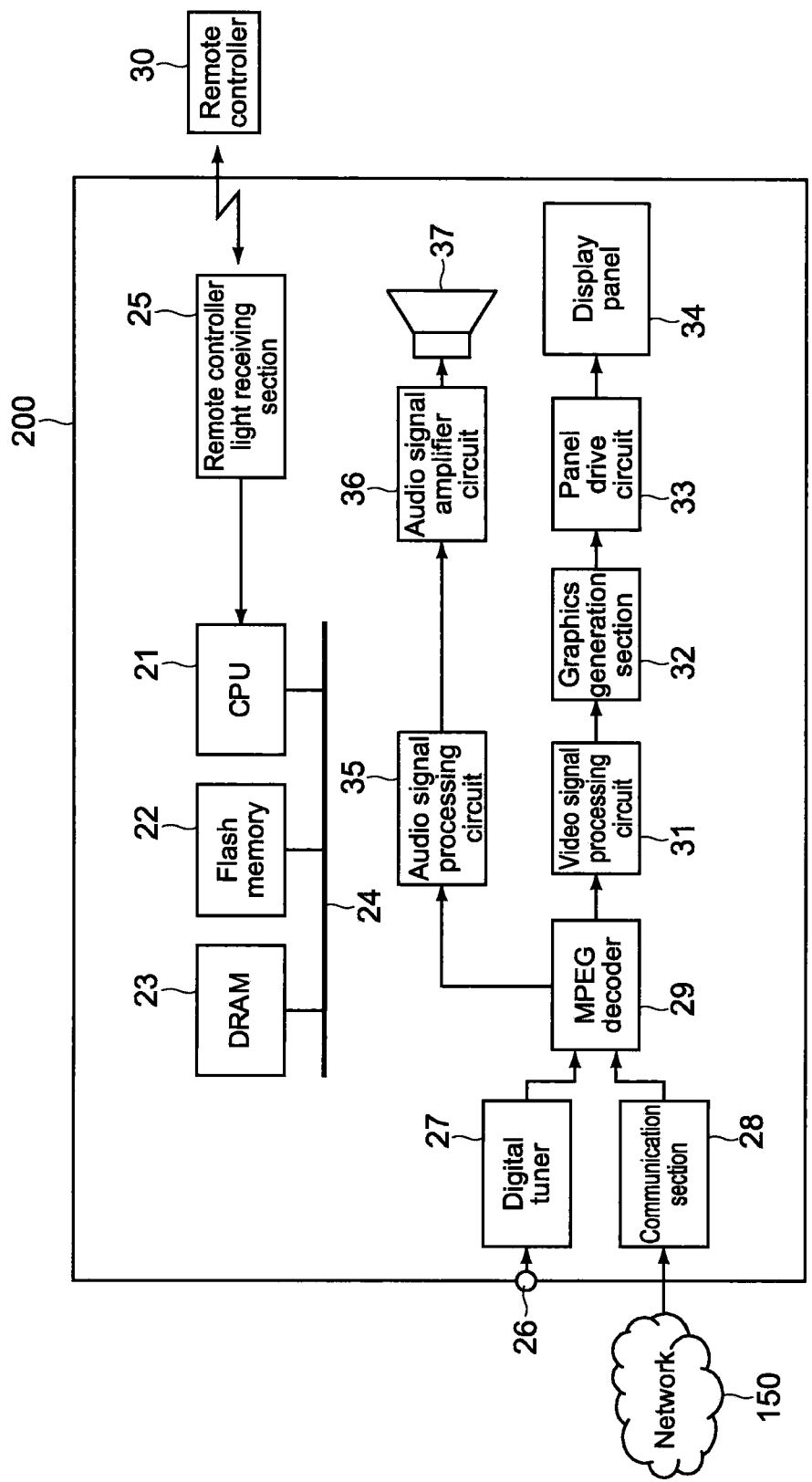
FIG. 5 is a diagram showing a hardware structure of a TV in the embodiment of the present invention.

FIG. 5 is a block diagram showing a hardware structure of the TV 200.

As shown in FIG. 5, the TV 200 includes a CPU 21, a flash memory 22, a DRAM (Dynamic RAM) 23, and an internal bus 24. The TV 200 further includes a remote controller light receiving section 25, a digital antenna input terminal 26, a digital tuner 27, and a communication section 28. Moreover, the TV 200 includes an MPEG decoder 29, a video signal processing circuit 31, a graphics generation section 32, a panel drive circuit 33, a display panel 34, an audio signal processing circuit 35, an audio signal amplifier circuit 36, and a speaker 37.

The digital antenna input terminal 26 inputs broadcast signals of digital broadcast received by a not-shown digital antenna. The digital tuner 27 selects signals of a channel designated by the broadcast signals and outputs the signals to the MPEG decoder 29.

The communication section 28 is constituted of, for example, an NIC or a modem, and executes communication processing with the server 100 or another device of a user, such as a mobile device, via the network 150. For example, the communication section 28 receives viewing history information from another device, and integrates it with viewing history information of the TV 200 to thereby transmit them to the server 100. Further, the communication section 28 receives recommendation information of contents from the server 100, transmits transmission request information of a content selected by a user based on the recommendation information to the server 100, and receives the content as a target of the transmission request from the server 100.

The MPEG decoder 29 decodes broadcast signals encoded according to the MPEG standard or content data received from the server 100 and outputs, out of the decoded signals, video signals to the video signal processing circuit 31 and audio signals to the audio signal processing circuit 35.

The video signal processing circuit 31 performs necessary video processing on the input video signals and output them to the graphics generation section 32. The graphics generation section 32 combines the input video signals and a GUI (Graphical User Interface) screen or the like by OSD (On Screen Display) processing and outputs them to the panel drive circuit 33. The panel drive circuit 33 performs a digital/analog conversion or the like of the video signals supplied from the graphics generation section 32 and drives the display panel 34 in accordance with analog video signals. The display panel 34 is, for example, an LCD, a PDP (Plasma Display Panel), an OEL (Organic Electro-Luminescence) display, or the like, and displays the analog video signals input from the panel drive circuit 33.

The audio signal processing circuit 35 performs necessary audio processing on the input audio signals and outputs the signals to the audio signal amplifier circuit 36. The audio signal amplifier circuit 36 adjusts the input audio signals to a necessary volume and outputs them to the speaker 37 for reproduction.

The CPU 21 accesses the DRAM 23 and the like as necessary and controls the blocks of the TV 200 collectively. The flash memory 22 is a nonvolatile memory that fixedly stores an OS executed by the CPU 21 and firmware such as programs including applications for receiving and reproducing contents, and various parameters. Further, the flash memory 22 stores, as the viewing history information, a channel selection history of selected and displayed broadcast channels (programs) or a reproduction history of contents such as DVD.

The DRAM 23 is a memory that is used as a working area or the like of the CPU 21 and temporarily stores the OS, programs, processed data, and the like. The CPU 21, the flash memory 22, and the DRAM 23 are connected to the internal bus 24 and they control the whole TV 200 by accessing each other.

The remote controller light receiving section 25 receives a user operation by remote control signals from a remote controller 30 and outputs the remote control signals to the CPU 21. Accordingly, the processing of selection, reception, reproduction, and the like of contents in response to the user operation are executed. The remote controller 30 includes various operation sections such as a numeric key, a menu button, various reproduction buttons, and the like corresponding to broadcast channels, for example. The TV 200 may include a button, a key, a touch panel, and the like in addition to the remote controller 30 and the remote controller light receiving section 25, or may receive operations from another input apparatus such as a mouse and a keyboard.

[Content Recommendation Operation by Server]

Next, regarding an operation of the system structured as described above, a content recommendation operation by the server 100 will be mainly described. Hereinafter, an operation of the server 100 will be mainly described with the software shown in FIG. 3 as main constituents of the operation. All the operation is executed under control of various hardware including the CPU 11 of the server 100.

(Content Dependence Information Generation Processing)

First, an operation of the content dependence information storage section 112 will be described.

Figure 6:
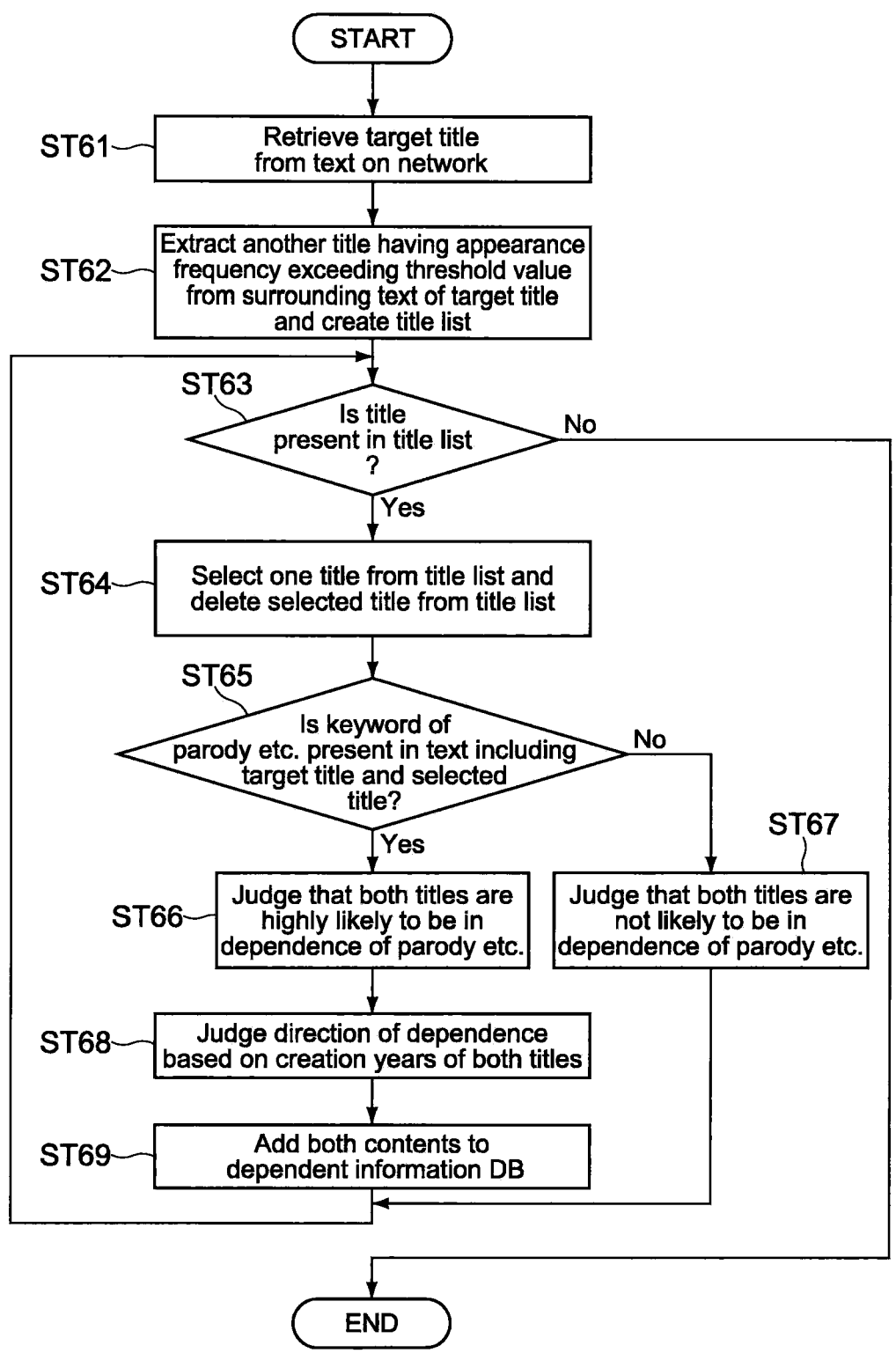
FIG. 6 is a flowchart showing a flow of generation processing of dependence information by a content dependence information storage section in the embodiment of the present invention.

FIG. 6 is a flowchart showing a flow of generation processing of the dependence information DB performed by the content dependence information storage section 112. Here, a movie and a drama exemplify contents. In the following descriptions, a parody, a spin-off, a crossover, a homage, and the like are collectively referred to as "parody and the like".

As shown in FIG. 6, first, the content dependence information storage section 112 acquires predetermined text information from the network 150, and retrieves a target title from the text information (Step 61).

Here, the text information is information regarding a movie or a drama, including a digitized introductory essay and critical essay, a weblog of a viewer, and an EPG (Electronic Program Guide) on the Internet, for example. The content dependence information storage section 112 may retrieve such text information from the Internet or may store in advance URLs (Uniform Resource Locators) of the text information and then acquire the text information through access to the URLs. The critical essay or a review is assumed to have a sufficient amount of information to execute statistical procedure. The sufficient amount of information refers to several thousand of words or several tens of thousands of words, but is not limited thereto.

The target title is determined from the contents stored in the content storage section 113, for example, in the order of the Japanese syllabary or at random. In a case where a large number of contents are stored in the content storage section 113 and need a long time for processing the contents, a target content may be determined in the order of popularity, for example. In this case, the popularity may be calculated based on an appearance frequency of a title in the review, for example.

Subsequently, the content dependence information storage section 112 extracts another title having an appearance frequency that exceeds a predetermined threshold value from a surrounding area of a text which is extracted from the text information and in which the target title appears, and creates a title list as to the another title (Step 62). Here, the "surrounding area of a text" refers to several sentences, several paragraphs, and the like, but is not limited thereto. In order to extract another title, the content dependence information storage section 112 includes an engine for data mining (text mining). For example, the content dependence information storage section 112 stores a large number of titles of movies and dramas as a dictionary, and then extracts another title by judging whether or not the titles present in the dictionary exist in the surrounding area of a text. Then, the content dependence information storage section 112 counts an appearance frequency of the extracted title in the surrounding area of a text, and in a case where the appearance frequency exceeds the threshold value, adds the title to the title list.

Subsequently, the content dependence information storage section 112 judges whether a title is present in the title list (Step 63). In a case where this step is executed for the first time after the title list is created, one or more titles are present in the title list as a matter of course.

If a title is present in the title list (Yes), the content dependence information storage section 112 selects one title from the title list and deletes the selected title from the title list (Step 64).

Subsequently, the content dependence information storage section 112 judges whether a keyword indicating dependence between the target title and the selected title is present in a predetermined range of the text in which both the titles co-occur (Step 65). The keyword indicating dependence refers to "parody", "spin-off", "crossover", "homage", and the like, but is not limited thereto.

If the keyword is present (Yes), the content dependence information storage section 112 judges that both the titles are highly likely to be in dependence of a parody and the like (Step 66). On the other hand, if the keyword is not present (No), the content dependence information storage section 112 judges that both the titles are not likely to be in dependence (Step 67), and returns to Step 63 described above to perform processing on the next title in the title list.

Further, the content dependence information storage section 112 may judge that both the titles are highly likely to be in dependence in a case where the keyword is merely present and, in addition, in a case where the content dependence information storage section 112 counts an appearance frequency of the keyword and the appearance frequency exceeds a predetermined threshold value.

Then, the content dependence information storage section 112 confirms creation years of the two titles that are judged to be highly likely to be in dependence, and judges that a title of an older creation year of the creation years is a title of a source of the parody, and the other title of a newer creation year of the creation years is a title of the parody and the like (Step 68). Of the two titles, a creation year of the target title is stored in the content storage section 113 as metadata, and accordingly the content dependence information storage section 112 can refer to the stored creation year information. In a case where the other title is also stored in the content storage section 113, creation year information thereof is similarly referred to from metadata. In a case where the other title is not stored in the content storage section 113, the content dependence information storage section 112 can acquire creation year information from a movie/drama database on the Internet and an online encyclopedia each having a URL that is stored in advance.

The content dependence information storage section 112 adds both the contents judged to be in dependence to the dependence information DB (Step 69). The content dependence information storage section 112 repeats the processing of Step 63 and the following steps with respect to all titles in the title list. Then, after performing the processing described above on all the contents stored in the content storage section 113, the content dependence information storage section 112 terminates the dependence information DB generation processing. The dependence information DB generation processing is executed regularly, constantly kept latest information, and used for content recommendation processing performed by the content recommendation section 114.

Figures 7, 8:
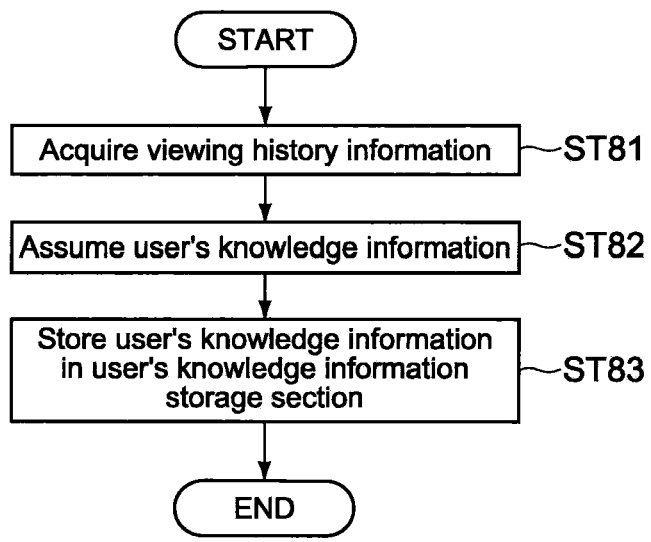
FIG. 7 is a diagram showing an example of the dependence information generated in the embodiment of the present invention.
FIG. 8 is a flowchart showing a flow of assumption processing of user's knowledge information by a user's knowledge information assumption section in the embodiment of the present invention.

FIG. 7 is a diagram showing an example of the dependence information DB generated described above.

As shown in FIG. 7, in the dependence information DB, titles of contents as a parody and the like (titles a, b . . . ) and titles of source contents of the parody and the like (titles A, B . . . ) are stored in association with each other. For an extra description, in FIG. 7 and the following figures, title names such as "title A" and "title a" are names imparted for convenience of description and are different from actual title names. Titles of contents as a parody and the like are not similar to titles of source contents of the parody and the like in many cases and therefore dependence therebetween is difficult to be grasped from the titles.

(User's Knowledge Information Assumption Processing)

Next, processing of the user's knowledge information assumption section 42 will be described.

FIG. 8 is a flowchart showing a flow of assumption processing of user's knowledge information by the user's knowledge information assumption section 42.

As shown in FIG. 8, the user's knowledge information assumption section 42 first acquires viewing history information of each user from the viewing history information input section 41 (Step 81).

Subsequently, the user's knowledge information assumption section 42 assumes knowledge information of each user of each TV 200 on each content, based on the viewing history information (Step 82). As described above, the knowledge information is, for example, information in which a title of a content that is assumed to have been viewed by a user is associated with the user name or the user ID or information on an amount of knowledge of the user with respect to the content.

Then, the user's knowledge information assumption section 42 stores the assumed user's knowledge information in the user's knowledge information storage section 43 (Step 83).

(Recommendation Information Generation Processing)

Figure 9:
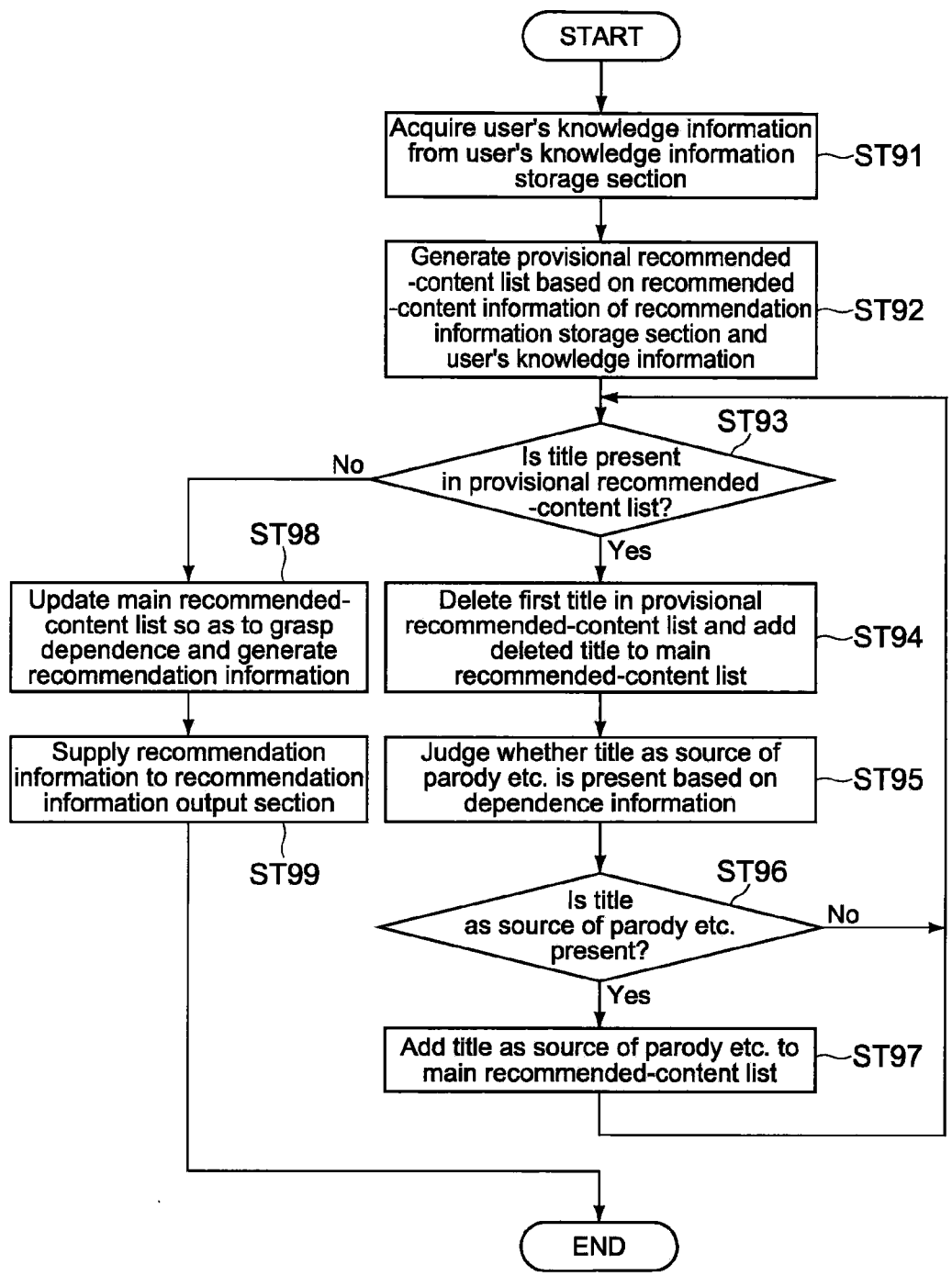
FIG. 9 is a flowchart showing a flow of recommendation information generation processing by a recommendation information generation section in the embodiment of the present invention.

Next, recommendation information generation processing by the recommendation information generation section 44 will be described. FIG. 9 is a flowchart showing a flow of the recommendation information generation processing.

As shown in FIG. 9, the recommendation information generation section 44 first acquires user's knowledge information from the user's knowledge information storage section 43 (Step 91).

Then, the recommendation information generation section 44 acquires recommended-content information from the recommendation information storage section 111 and generates a provisional recommended-content list based on the recommended-content information and the user's knowledge information (Step 92). The provisional recommended-content list is generated using an algorithm such as a collaborative filtering and a content-based filtering.

In a case where the collaborative filtering is used, based on viewing history information of users of the plurality of TVs 200, the provisional recommended-content list is generated using viewing history information of one user and that of another user having similar viewing preference, that is, similar viewing history information. Specifically, the recommendation information generation section 44 extracts viewing history information of a user, which is similar to viewing history information of a user targeted for recommendation, and then determines a content included in the viewing history information of the user but not included in the viewing history information of the user targeted for recommendation as a provisional recommended content. Similarity of viewing history information is judged depending on whether common viewing contents exist more than a predetermined threshold value, for example.

In a case where the content-based filtering is used, the provisional recommended-content list is generated using metadata included in each content. Specifically, the recommendation information generation section 44 determines a content that is assumed to be similar to a content included in the viewing history information of the user targeted for recommendation as a provisional recommended content, based on similarity among metadata including a director name, a performer name, a genre, and the like.

Subsequently, the recommendation information generation section 44 judges whether a title is present in the provisional recommended-content list (Step 93). In a case where this step is executed for the first time after the provisional recommended-content list is created, one or more titles are present in the provisional recommended-content list as a matter of course.

If a title is present in the provisional recommended-content list (Yes), the recommendation information generation section 44 deletes a first title in the provisional recommended-content list and adds the deleted title to a main recommended-content list (Step 94).

The recommendation information generation section 44 then acquires dependence information from the content dependence information storage section 112, and judges whether a title that is a source of a parody and the like is present as to the title added to the main recommended-content list based on the dependence information (Step 95).

If a title that is a source of a parody and the like is present (Yes in Step 96), the recommendation information generation section 44 adds the title that is a source of a parody and the like to the main recommended-content list (Step 97). If a title that is a source of a parody and the like is not present (No in Step 96), the recommendation information generation section 44 returns to Step 93 above and executes the processing of Step 94 and the following steps for the next title in the provisional recommended-content list.

In Step 93 above, if a title is not present in the provisional recommended-content list (No), the recommendation information generation section 44 generates recommendation information based on the main recommended-content list (Step 98). In other words, when all titles in the provisional recommended-content list are checked for the dependence information, the recommendation information generation section 44 updates the main recommended-content list so that dependence among the titles is grasped by the user and generates recommendation information.

FIG. 10 is a diagram showing an example of the generated main recommended-content list.

As shown in FIG. 10, the main recommended-content list is generated so that contents to be recommended are divided into titles of contents as a parody and the like, and titles of source contents of the contents as a parody and the like. In a case where a content does not have a source content of a parody and the like, only the content is listed.

The recommendation information generation section 44 executes the processing described above for each user targeted for recommendation, and supplies the generated recommendation information to the recommendation information output section 45 (Step 99). The recommendation information output section 45 transmits the recommendation information to the TV 200, for example, in response to a request of a user of the TV 200 or regularly. On the TV 200, a recommended-content list is displayed based on the recommendation information. Then, the content storage section 113 is requested to transmit a content selected by a user who refers to the recommended-content list, and then the content is transmitted to the TV 200.

Various examples of the recommendation information in which a user can grasp the dependence are conceivable. Hereinafter, the examples will be descried.

Figure 11:
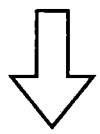
FIGS. 11A to 11C are diagrams showing a state where recommended contents are determined with viewing history information of a plurality of users, by a known method using a collaborative filtering.

FIGS. 11A to 11C are diagrams showing a state where recommended contents are determined with viewing history information of a plurality of users, by a known method using a collaborative filtering.

As shown in FIGS. 11A to 11C, in the known method using the collaborative filtering, titles that do not exist in viewing history information of a user A, out of contents existing in viewing history information of a user B, which is similar to that of the user A, are determined as recommended contents of the user A as they are. In FIGS. 11A to 11C, titles A to F are source contents of a parody and the like having titles a to f, respectively.

In this method, the title B and the title b that is a parody and the like of the title B are recommended to the user A. However, in a case where the user A has not viewed the title B, the user A may view the title b based on the recommended-content list. In such a circumstance, since the user A does not have background knowledge obtained by viewing the title B, the user A cannot enjoy the title b even when viewing the title b.

Figure 12:
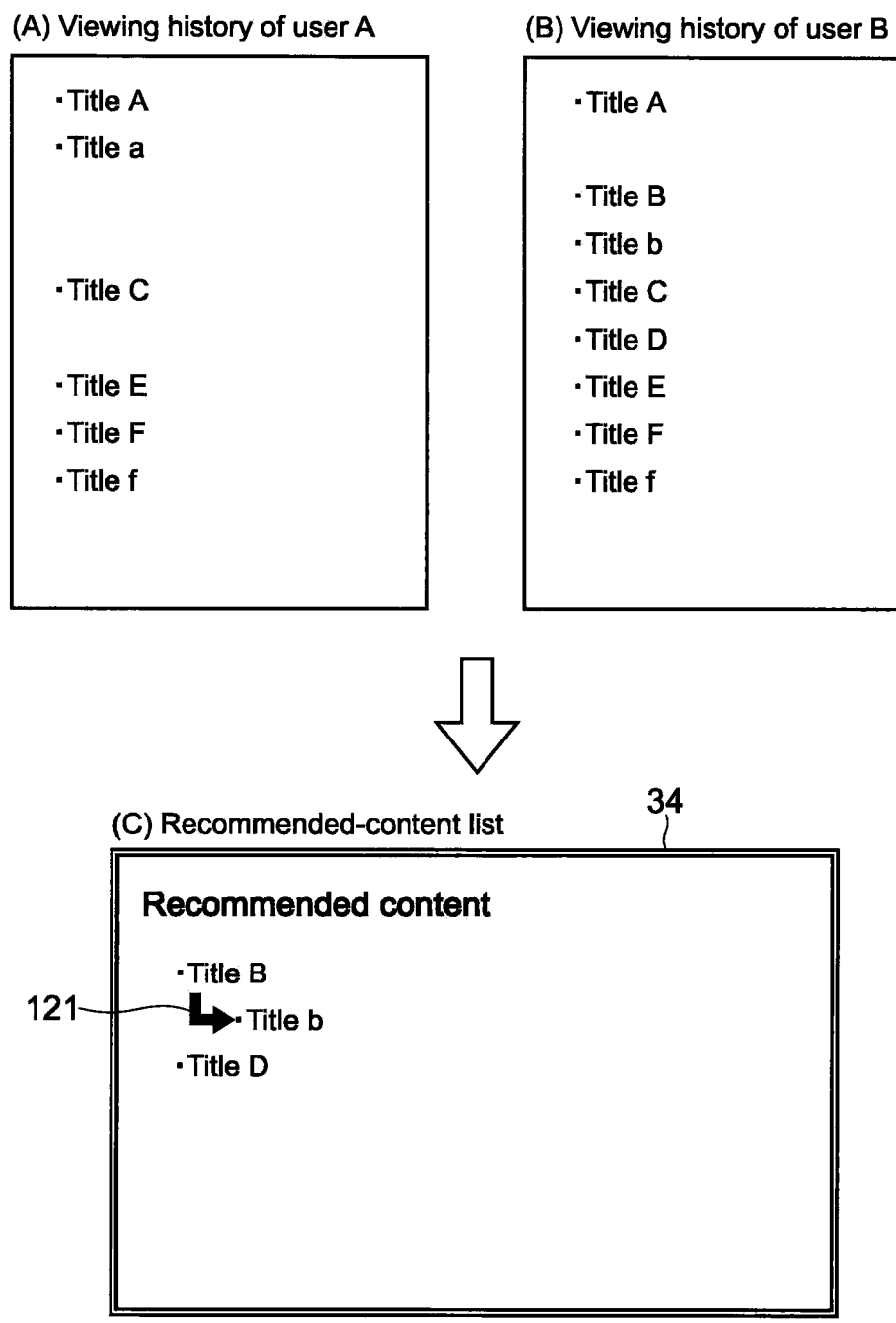
FIGS. 12A to 12C are diagrams showing an example of a recommended-content list displayed on a TV of a user based on recommendation information that is generated in a form in which the user can grasp dependence in the embodiment of the present invention.

FIGS. 12A to 12C are diagrams showing an example of a recommended-content list displayed on the display panel 34 of the TV 200 of a user based on recommendation information that is generated in a form in which the user can grasp the dependence.

As shown in FIGS. 12A to 12C, in the recommended-content list, the title b is displayed below the title B with an indent by an arrow 121. Accordingly, the user can grasp at a glance that the content of the title b is dependent on the content of the title B and the title B should be viewed before the title b. In this case, the recommendation information generation section 44 updates descriptions of the main recommended-content list so that the title b is displayed below the title B with an indent, thus generating the recommendation information.

As a matter of course, the recommendation information generation section 44 can adopt various display forms other than the indented display described above as long as the title b is displayed while being subordinate to the title B.

Figure 13:
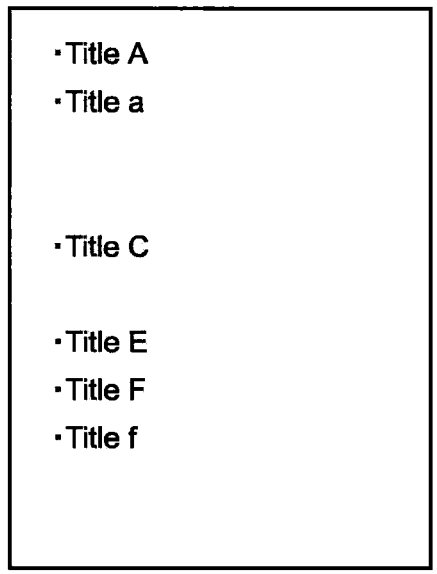
FIGS. 13A to 13C are diagrams showing another example of the recommended-content list displayed on the TV of the user based on the recommendation information that is generated in the form in which the user can grasp the dependence in the embodiment of the present invention.
Figure 13:
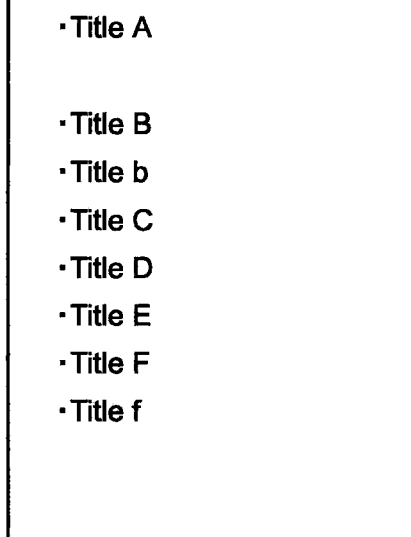
Figure 13:
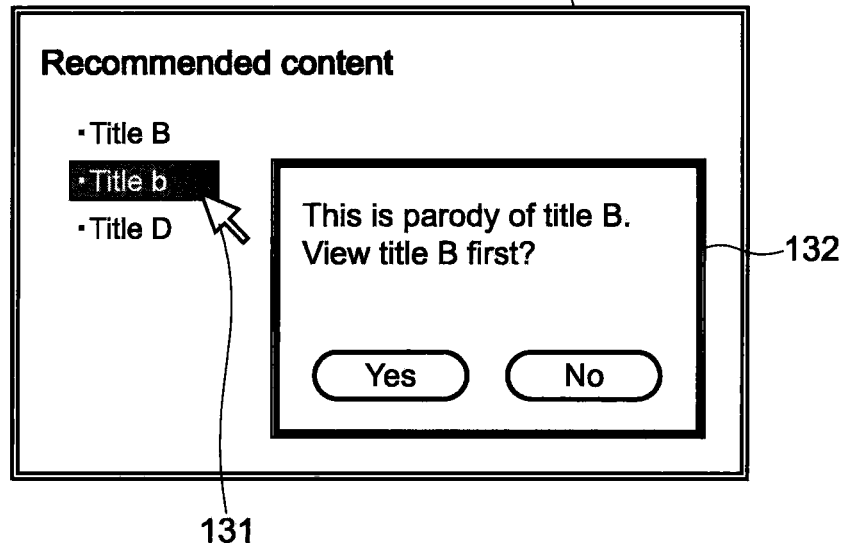

FIGS. 13A to 13C are diagrams showing another example of the recommended-content list displayed on the display panel 34 of the TV 200 of the user.

As shown in FIGS. 13A to 13c, in the recommended-content list, in a case where the title b that is a content as a parody and the like is selected by, for example, a pointer 131 in accordance with an operation of the remote controller 30, information notifying the dependence is displayed by a pop-up window 132.

In other words, when the title b is selected, for example, it is notified that the title b is a parody of the title B, and the pop-up window 132 for confirming with the user whether the user views the title B before the title b is displayed. The user can grasp at a glance that the title b is a parody and the like of the title B by the pop-up window 132. Further, when the user presses a "Yes" button on the pop-up window 132, the title B is requested from the TV 200 to the content transmission section 115 of the server 100, and is downloaded to the TV 200 and reproduced. Accordingly, the server 100 can causes the user to view the title B that is a source of a parody and the like as the title b before the title b.

In this case, when a title of a content as a parody and the like is selected, the recommendation information generation section 44 only needs to update the main recommended-content list so that the pop-up window 132 is displayed, and generate the recommendation information. In order to display the pop-up window 132 on the display panel 34, for example, script languages including Java (registered trademark) Script, Perl, and PHP are used in generation of the recommendation information.

As described above, according to this embodiment, the server 100 can generate the recommendation information in a form in which the dependence among contents can be grasped based on the dependence information. Accordingly, the server 100 can prevent a content as a parody and the like from being viewed by a user before a source content of the parody and the like.

(Modifications)

The present invention is not limited to the embodiment described above, and various modifications can be made without departing from the gist of the present invention.

In the embodiment described above, the recommendation information generation section 44 generates recommendation information in a form in which a user can grasp dependence among contents. However, as long as it is possible to prevent a content as a parody and the like from being viewed before a source content of the parody and the like, dependence among contents may not be necessary to be shown in the recommended-content list. For example, the recommendation information generation section 44 may delete a title of a parody and the like from the main recommended-content list in a case where the title of a parody and the like is present in the main recommended-content list and a title of a source of the parody and the like is not present therein.

FIGS. 14A to 14C are diagrams showing an example of a recommended-content list displayed on the display panel 34 of the TV 200 based on the recommendation information thus generated.

As shown in FIGS. 14A to 14C, even when the viewing history of the user A does not include the title b that exists in the viewing history information of the user B, the title b is deleted from the main recommended-content list. Accordingly, in the recommended-content list displayed on the TV 200, the title b that is displayed when the known method is used is not displayed. Thus, the server 100 can prevent the title b that is a parody and the like of the title B from being viewed before the title B that is a source of the parody and the like.

In the embodiment described above, the content dependence information storage section 112 extracts a keyword such as "parody" from a review, a critical essay, and the like regarding movies, dramas, and the like to judge dependence between contents. However, the content dependence information storage section 112 may judge dependence using metadata of contents (information including characters of contents, names of actors performing the characters, main character names, director names, producer names, and the like).

For example, at least certain characters are shared between contents of a spin-off relationship. Accordingly, the content dependence information storage section 112 may retrieve the characters of the contents from a weblog of a viewer or a text in an online encyclopedia of a user participation type, and judge two contents having common characters as contents of a spin-off relationship. In this case, the content dependence information storage section 112 may include a dictionary for extracting characters or extract characters by analyzing a text structure (tag) of the online encyclopedia or the like.

Further, between the contents in a spin-off relationship, at least certain characters are shared and names of main characters are different. Accordingly, the content dependence information storage section 112 may further retrieve the names of main characters from the text and judge that the contents having shared characters and different names of main characters are contents of a spin-off relationship. In this case, the content dependence information storage section 112 may also include a dictionary for extracting names of main characters or extract names of main characters by analyzing a text structure (tag) of the online encyclopedia or the like.

Moreover, in a content of a crossover, main characters of two or more different contents appear as main characters of the content. Accordingly, when two or more main character names are extracted in a certain content and each of the main character names is extracted as a main character name of each of a plurality of different contents, the content dependence information storage section 112 may judge that the plurality of different contents and the certain content are in a crossover relationship.

In addition, the content dependence information storage section 112 may judge a spin-off relationship or a crossover relationship by extracting information including a name of an actor performing a character, a director name, a producer name, and the like from a text on the network.

In the embodiment described above, the recommendation information generation section 44 generates a provisional recommended-content list using an algorithm such as a collaborative filtering and a content-based filtering. However, the recommendation information generation section 44 may generate a provisional recommended-content list using another algorithm such as Bayesian network and a rule-based (intentional) filtering.

In the embodiment described above, the recommendation information generation section 44 generates a provisional recommended-content list using viewing history information of users. However, the recommendation information generation section 44 may receive evaluation information of users on contents from the TVs 200 and generate the provisional recommended-content list together with the viewing history information.

In the embodiment described above, the content dependence information storage section 112 judges dependence between contents by a keyword such as a "parody". However, the content dependence information storage section 112 may judge the dependence by extracting, other than keyword, a text showing dependence of two titles, such as the following sentence, "a title A is produced based on a title B". In this case, the content dependence information storage section 112 only needs to grasp a text indicating dependence by executing processing of a morphological analysis or a syntax analysis with respect to the text information.

In the embodiment described above, after the dependence information DB is generated by the content dependence information storage section 112, the recommendation information is generated by recommendation information generation section 44. However, at a time when titles of contents are listed in the main recommended-content list by the recommendation information generation section 44, dependence information may be generated by the content dependence information storage section 112.

In the embodiment described above, there is shown an example in which the present invention is applied to the server 100 and the server 100 recommends contents to the TV 200. However, the present invention can be realized with a local device such as the TV 200 without using the server 100. The local device only needs to have functions of software included in the server 100 as shown in FIG. 3. In this case, contents stored in the local device are a broadcast program recorded on a recording apparatus such as an HDD, a content downloaded through the Internet, and the like. The local device only needs to store a reproduction history of a content reproduced by the local device as viewing history information of a user. Further, the local device may receive, as viewing history information, viewing experience information of contents, such as movie viewing experience, from another portable device of a user who is an owner of the local device and store it.

Further, the present invention can also be applied to a recording/reproducing apparatus using a recording medium such as an HDD, a DVD, and a BD. Besides them, the present invention can further be applied to other electric appliances such as a digital still camera, a digital video camera, a portable AV apparatus, a cellular phone, a game device, a robot apparatus, a PDA (Personal Digital Assistant), and car navigation device.

The present application contains subject matter related to that disclosed in Japanese Priority Patent Application JP 2008-265077 filed in the Japan Patent Office on Oct. 14, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus, comprising:
   a storage means for storing a plurality of contents, titles of the plurality of contents, and viewing history information on viewing histories of the plurality of contents by a user;
   a first generation means for generating, based on the stored viewing history information, recommendation display information that contains as a recommended-content list a list of titles of contents that the user has not viewed out of the plurality of stored contents;
   a second generation means for generating dependence information that indicates an audience preference for viewing a first content out of the plurality of contents before viewing a second content out of the plurality of contents wherein the preference is based on whether the first content served as a basis for the creation of the second content;
   an update means for updating, based on the dependence information, the recommendation display information so that the user is prevented from viewing the second content before the first content; and
   an output means for outputting the updated recommendation display information.

2. An electronic apparatus, comprising:
   a storage section configured to store a plurality of contents, titles of the plurality of contents, and viewing history information on viewing histories of the plurality of contents by a user;
   a first generation section configured to generate, based on the stored viewing history information, recommendation display information that contains as a recommended-content list a list of titles of contents that the user has not viewed out of the plurality of stored contents;
   a second generation section configured to generate dependence information that indicates an audience preference for viewing a first content out of the plurality of contents before viewing a second content out of the plurality of contents based on whether the first content served as a basis for the creation of the second content;
   an update section configured to update, based on the dependence information, the recommendation display information so that the user is prevented from viewing the second content before the first content; and
   an output section configured to output the updated recommendation display information.

3. The electronic apparatus according to claim 2, wherein the update section adds a title of the first content to the recommended-content list when the second content is contained in the recommended-content list but the first content is excluded therein.

4. The electronic apparatus according to claim 3, wherein the update section updates the recommendation display information so that a title of the second content is displayed in subordination to the title of the first content.

5. The electronic apparatus according to claim 3, wherein the update section updates the recommendation display information so that information notifying that, before the second content, the first content is to be viewed is output, when a title of the second content displayed on the recommended-content list is selected based on the recommendation display information by an operation of the user.

6. The electronic apparatus according to claim 2, wherein the update section deletes a title of the second content from the recommended-content list when the title of the second content is contained in the recommended-content list but a title of the first content is excluded therein.

7. The electronic apparatus according to claim 2, wherein the storage section stores creation year information indicating creation years of the plurality of contents and a predetermined keyword indicating dependence, and
   wherein the second generation section includes
      an extraction section configured to extract a first title out of the plurality of titles from text information,
      a retrieval section configured to retrieve a second title different from the first title and the predetermined keyword from a predetermined range of a text in text information, the predetermined range including the extracted first title, and
      a judgment section configured to judge, when a predetermined number or more of the second titles are retrieved and the predetermined keyword is retrieved, that a content having an earlier creation year of the creation years is the first content and a content having later creation years of the creation years is the second content out of the two contents corresponding to the first title and the second title, based on the stored creation year information.

8. The electronic apparatus according to claim 2,
wherein the storage section stores creation year information indicating creation years of the plurality of contents, and
wherein the second generation section includes
   a retrieval section configured to retrieve character names in the plurality of contents from text information, and
   a judgment section configured to judge, when the retrieved character names are common to two contents out of the plurality of contents, that a content having an earlier creation year of the creation years is the first content and a content having a later creation year of the creation years is the second content out of the two contents, based on the stored creation year information.

9. The electronic apparatus according to claim 8,
wherein the retrieval section retrieves main character names in the plurality of contents, and
wherein the judgment section judges, when the retrieved character names are common to two contents out of the plurality of contents and the main character names in the two contents are different from each other, that a content having an earlier creation year of the creation years is the first content and a content having a later creation year of the creation years is the second content.

10. The electronic apparatus according to claim 2,
wherein the second generation section includes
   a retrieval section configured to retrieve main character names in the plurality of contents from text information, and
   a judgment section configured to judge, when at least two of the main character names are retrieved from one content out of the plurality of contents and at least two of the main character names are individually retrieved as main character names of other contents out of the plurality of contents, that the other contents are the first contents and the one content is the second content.

11. A content recommendation method, comprising:
storing a plurality of contents, titles of the plurality of contents, and viewing history information on viewing histories of the plurality of contents by a user;
generating, based on the stored viewing history information, recommendation display information that contains as a recommended-content list a list of titles of contents that the user has not viewed out of the plurality of stored contents;
generating dependence information that indicates an audience preference for viewing a first content out of the plurality of contents before viewing a second content out of the plurality of contents wherein the preference is based on whether the first content served as a basis for the creation of the second content;
updating, based on the dependence information, the recommendation display information so that the user is prevented from viewing the second content before the first content; and
outputting the updated recommendation display information.

12. A non-transitory, computer-readable storage medium storing a program that, when executed by an electronic apparatus, causes the electronic apparatus to perform a method, the method comprising:
storing a plurality of contents, titles of the plurality of contents, and viewing history information on viewing histories of the plurality of contents by a user;
generating, based on the stored viewing history information, recommendation display information that contains as a recommended-content list a list of titles of contents that the user has not viewed out of the plurality of stored contents;
generating dependence information that indicates an audience preference for viewing a first content out of the plurality of contents before viewing a second content out of the plurality of contents wherein the preference is based on whether the first content served as a basis for the creation of the second content;
updating, based on the dependence information, the recommendation display information so that the user is prevented from viewing the second content before the first content; and
outputting the updated recommendation display information.

\* \* \* \* \*